US012625846B2

(12) United States Patent
Yeo

(10) Patent No.: US 12,625,846 B2
(45) Date of Patent: May 12, 2026

(54) CONTROLLING ACTIONS IN A FILE SYSTEM ENVIRONMENT USING BUCKETS CORRESPONDING TO PRIORITY

(71) Applicant: Oracle International Corporation, Redwood Shores, CA (US)

(72) Inventor: Hwee Lin Yeo, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/936,451

(22) Filed: Nov. 4, 2024

(65) Prior Publication Data

US 2025/0238398 A1 Jul. 24, 2025

Related U.S. Application Data

(63) Continuation of application No. 18/418,479, filed on Jan. 22, 2024, now Pat. No. 12,174,793.

(51) Int. Cl.
*G06F 16/00* (2019.01)
*G06F 9/50* (2006.01)
*G06F 16/16* (2019.01)

(52) U.S. Cl.
CPC ............ *G06F 16/16* (2019.01); *G06F 9/5038* (2013.01)

(58) Field of Classification Search
CPC .... G06F 3/0629; G06F 11/3034; G06F 3/067; G06F 3/0604; G06F 3/0653; G06F 11/3409; G06F 3/0683; G06F 2201/815; G06F 11/2094; G06F 2201/81; G06F 16/128; G06F 11/2064; G06F 11/2082; G06F 3/065; G06F 16/182; G06F 16/10;
(Continued)

(56) References Cited

U.S. PATENT DOCUMENTS 9,413,680 B1 8/2016 Kusters et al.
9,860,317 B1 1/2018 Gupta
(Continued)

OTHER PUBLICATIONS

"PowerScale: NDMP Technical Overview and Design Considerations—Backup Types", Dell Technologies, Available Online at: https://infohub.delltechnologies.com/l/powerscale-ndmp-technical-overview-and-design-considerations/backup-types/, Accessed from Internet on Sep. 28, 2023, pp. 1-2.
(Continued)

*Primary Examiner* — Yicun Wu
(74) *Attorney, Agent, or Firm* — Kilpatrick Townsend & Stockton LLP

(57) ABSTRACT

A method can include receiving requests to perform actions in a file system environment. The method can include populating a first bucket with first tokens. The first bucket can be associated with actions in the file system environment. The method can include populating second buckets, which can correspond to different tenants, with corresponding second tokens based on priorities of the tenants. The second tokens may correspond to allowable actions on behalf of the tenants. Each token of the first tokens and the second tokens may be in one-to-one correspondence with a single action. The method can include prioritizing the second buckets. The method can include generating an execution list for executing the requests. The method can include executing the execution list based on the first tokens and the second tokens.

20 Claims, 9 Drawing Sheets

(58) Field of Classification Search
CPC .. G06F 3/0619; G06F 2201/84; G06F 3/0613;
G06F 3/064; G06F 3/0685; G06F 3/0644;
G06F 3/0659; G06F 3/0656; G06F
3/0607; G06F 3/061; H04L 67/564; H04L
67/1097; H04L 67/566; H04L 67/10;
H04L 9/40
See application file for complete search history.

(56) References Cited

U.S. PATENT DOCUMENTS

| | | | |
|---|---|---|---|
| 11,086,898 | B2 | 8/2021 | Muniswamy-Reddy et al. |
| 11,567,836 | B1 | 1/2023 | Jagan Mohan et al. |
| 11,599,508 | B1 | 3/2023 | Harward et al. |
| 11,698,914 | B1 * | 7/2023 | Duvedi .................. G06F 16/28 |
| | | | 707/803 |
| 11,934,660 | B1 | 3/2024 | Mcmullan et al. |
| 2017/0118287 | A1 | 4/2017 | Beck |
| 2022/0027059 | A1 | 1/2022 | Chen et al. |

OTHER PUBLICATIONS

"PowerScale: NDMP Technical Overview and Design Considerations—Overview", Dell Technologies, Available Online at: https://infohub.delltechnologies.com/l/powerscale-ndmp-technical-overview-and-design-considerations/overview-2362/, Accessed from Internet on Sep. 28, 2023, pp. 1-2.

"Set up the SnapTool External Snapshots Manager", Weka, Available Online at: https://docs.weka.io/monitor-the-weka-cluster/snapshot-management, Accessed from Internet on Sep. 28, 2023, pp. 1-13.

"System Recovery and Snapshot Management with Snapper", Chapter 7, SLES 12 SP5, Available Online at: https://documentation.suse.com/sles/12-SP5/html/SLES-all/cha-snapper.html, Accessed from Internet on Sep. 29, 2023, pp. 1-45.

U.S. Appl. No. 18/418,479, Notice of Allowance, Mailed on Sep. 30, 2024, 10 pages.

* cited by examiner

200

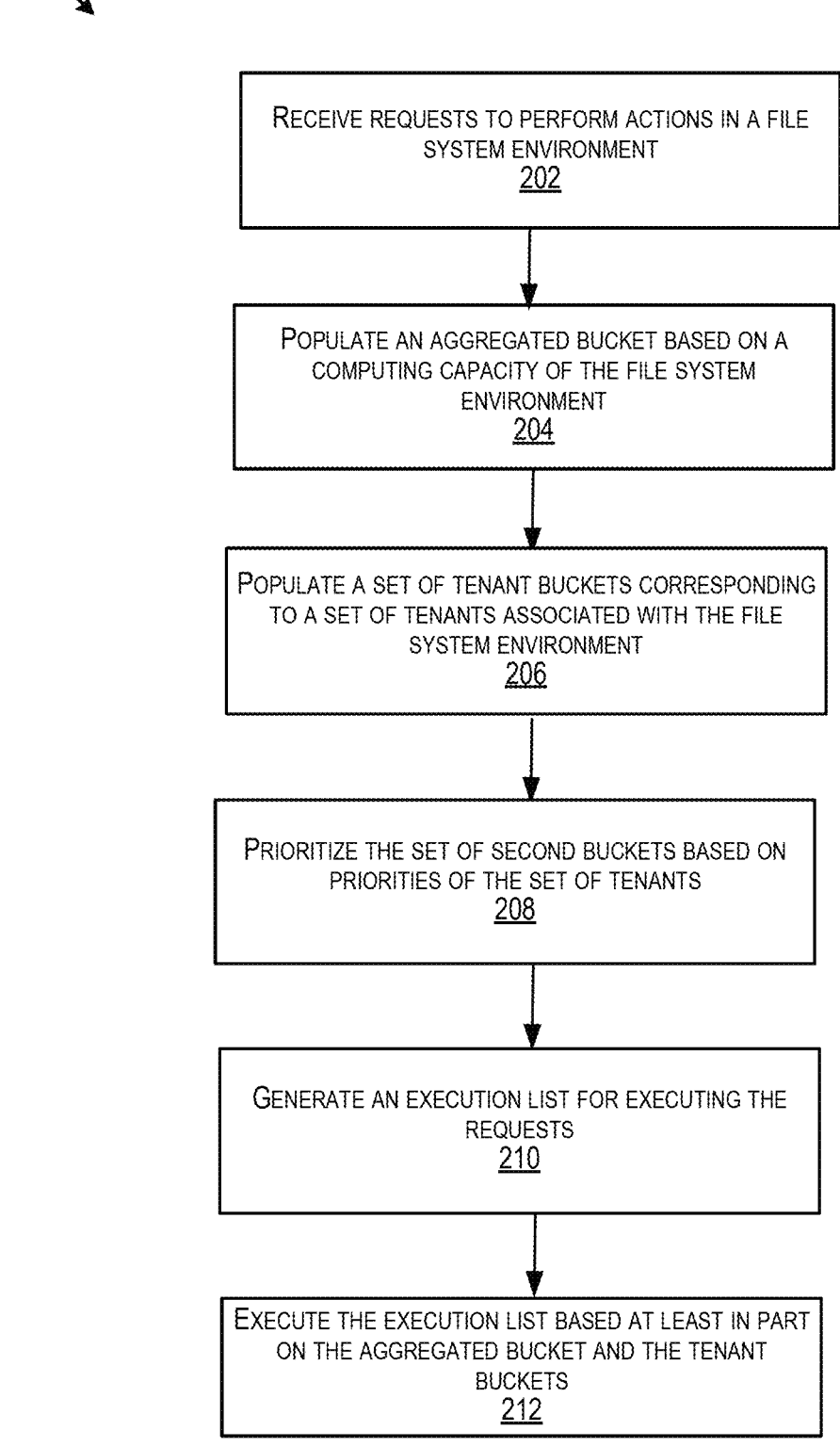

RECEIVE REQUESTS TO PERFORM ACTIONS IN A FILE
SYSTEM ENVIRONMENT
202

POPULATE AN AGGREGATED BUCKET BASED ON A
COMPUTING CAPACITY OF THE FILE SYSTEM
ENVIRONMENT
204

POPULATE A SET OF TENANT BUCKETS CORRESPONDING
TO A SET OF TENANTS ASSOCIATED WITH THE FILE
SYSTEM ENVIRONMENT
206

PRIORITIZE THE SET OF SECOND BUCKETS BASED ON
PRIORITIES OF THE SET OF TENANTS
208

GENERATE AN EXECUTION LIST FOR EXECUTING THE
REQUESTS
210

EXECUTE THE EXECUTION LIST BASED AT LEAST IN PART
ON THE AGGREGATED BUCKET AND THE TENANT
BUCKETS
212

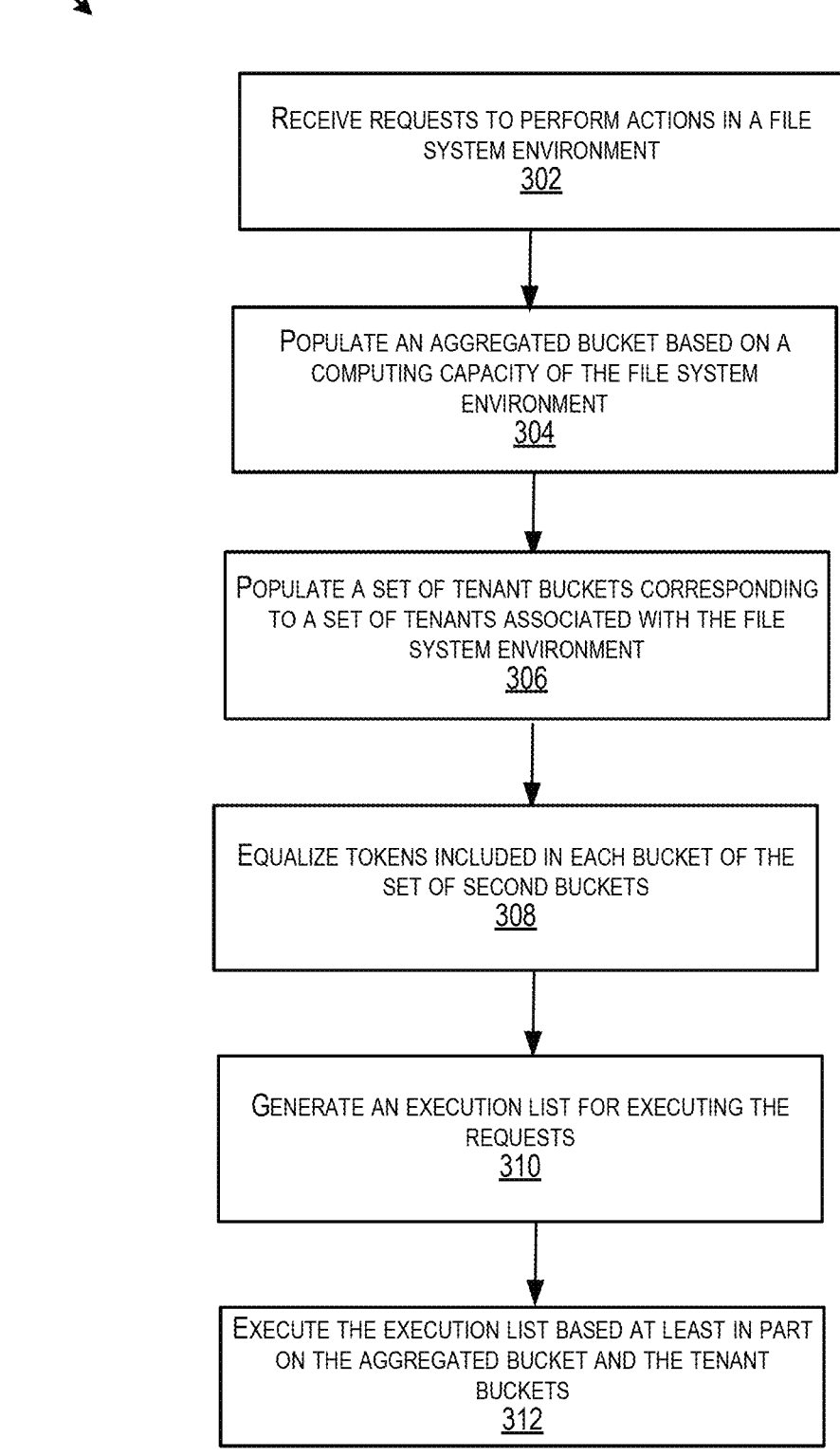

RECEIVE REQUESTS TO PERFORM ACTIONS IN A FILE
SYSTEM ENVIRONMENT
302

POPULATE AN AGGREGATED BUCKET BASED ON A
COMPUTING CAPACITY OF THE FILE SYSTEM
ENVIRONMENT
304

POPULATE A SET OF TENANT BUCKETS CORRESPONDING
TO A SET OF TENANTS ASSOCIATED WITH THE FILE
SYSTEM ENVIRONMENT
306

EQUALIZE TOKENS INCLUDED IN EACH BUCKET OF THE
SET OF SECOND BUCKETS
308

GENERATE AN EXECUTION LIST FOR EXECUTING THE
REQUESTS
310

EXECUTE THE EXECUTION LIST BASED AT LEAST IN PART
ON THE AGGREGATED BUCKET AND THE TENANT
BUCKETS
312

*FIG. 3*

CONTROLLING ACTIONS IN A FILE SYSTEM ENVIRONMENT USING BUCKETS CORRESPONDING TO PRIORITY

CROSS REFERENCE TO RELATED APPLICATIONS

This application is a continuation of U.S. application Ser. No. 18/418,479, filed Jan. 22, 2024, the disclosure of which is hereby incorporated by reference in its entirety.

BACKGROUND

A file system environment can provide tenants with the opportunity to automate various actions with respect to a corresponding file system. For example, a tenant may use a file system to store data files, to analyze the data files, to generate backups, and the like. In some examples, the file system environment can receive requests for scheduling the various actions to be performed, for example at a later time, periodically at known intervals, or the like. The file system environment may have an excessive number of tenants and corresponding file systems that may transmit the requests such that the file system environment may experience latency in performing the requested actions, may fail to perform the requested actions within requested parameters, or may experience other technical problems with providing services to the tenants.

BRIEF SUMMARY

In certain embodiments, a method can be used to control actions in a file system environment based at least in part on priorities assigned to tenants associated with file systems included in the file system environment. The method can include receiving, by a computing system, such as a control application programming interface (control API), a set of requests to generate data backups from a set of tenants associated with the file system environment. The method can include populating, by the computing system, a first bucket with a first set of tokens. The first bucket can be associated with global actions of the file system environment, and a first maximum number of the first set of tokens can correspond to a computational capacity of the file system environment. Each token of the first set of tokens can represent a single action that can be performed by the file system environment. The method can include populating, by the computing system, each second bucket of a set of second buckets with a corresponding second set of tokens of a set of second sets of tokens. Each second bucket of the set of second buckets can be associated with a different tenant of the set of tenants, and each second set of tokens of the set of second sets of tokens can have a different second maximum number of tokens corresponding to an allowable number of actions for a corresponding tenant. Each token of each second set of tokens of the set of second sets of tokens can represent a single action that can be performed by the file system environment. The method can include prioritizing, by the computing system, each second bucket of the set of second buckets by adjusting the different second maximum number of tokens such that a first second bucket of the set of second buckets associated with a first tenant of the set of tenants has a first maximum number of tokens that is different than a second maximum number of tokens of a different second bucket of the set of second buckets associated with a different tenant of the set of tenants. The method can include generating, by the computing system, an execution list for executing the set of requests based at least in part on the first bucket and the set of second buckets. The method can include executing, by the computing system, the execution list based at least in part on a first number of tokens in the first bucket and a second number of tokens in the set of second buckets.

In certain examples, the method can additionally include identifying a particular request of the set of requests and a particular tenant of the set of tenants associated with the particular request. The method can additionally include determining a first number of tokens remaining in a particular second bucket of the set of second buckets associated with the particular tenant. The method can additionally include, in response to determining that the first number of tokens is greater than zero, performing one or more operations associated with the particular request. The method can additionally include deducting one or more tokens from the particular second bucket of the plurality of second buckets. The one or more tokens may be in one-to-one correspondence with the one or more operations.

In certain examples, the method can additionally include identifying a particular request of the set of requests and a particular tenant of the set of tenants associated with the particular request. The method can additionally include determining a first number of tokens remaining in a particular second bucket of the set of second buckets associated with the particular tenant. The method can additionally include, in response to determining that the first number of tokens is zero or less than zero, preventing one or more operations associated with the particular request from being performed.

In certain examples, the method can additionally include determining a second number of tokens remaining in the first bucket. The method can additionally include, in response to determining that the second number of tokens is zero or less than zero, preventing one or more operations associated with the particular request from being performed.

In certain examples, the method can additionally include determining a second number of tokens remaining in the first bucket. The method can additionally include, in response to determining that the second number of tokens is greater than zero, performing the one or more operations associated with the particular request. The method can additionally include deducting one or more tokens from the first bucket. The one or more tokens may be in one-to-one correspondence with the one or more operations.

In certain examples, the method can additionally include, for each single action taken by the file system environment, deducting one token from the first bucket and from a corresponding second bucket of the set of second buckets. The method can additionally include continuously refilling the first bucket based at least in part on an expected future computational capacity of the file system environment.

In certain examples, the method can additionally include continuously refilling the corresponding second bucket based at least in part on a priority assigned to a corresponding tenant associated with the corresponding second bucket.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF DRAWINGS

Features, embodiments, and advantages of the present disclosure are better understood when the following Detailed Description is read with reference to the accompanying drawings.

FIG. 2 is a flowchart of a process to use buckets to prioritize requested actions in a file system environment, according to at least one embodiment.

FIG. 3 is a flowchart of a process to use buckets to ensure fairness with respect to tenants in a file system environment, according to at least one embodiment.

DETAILED DESCRIPTION

Figure 1:
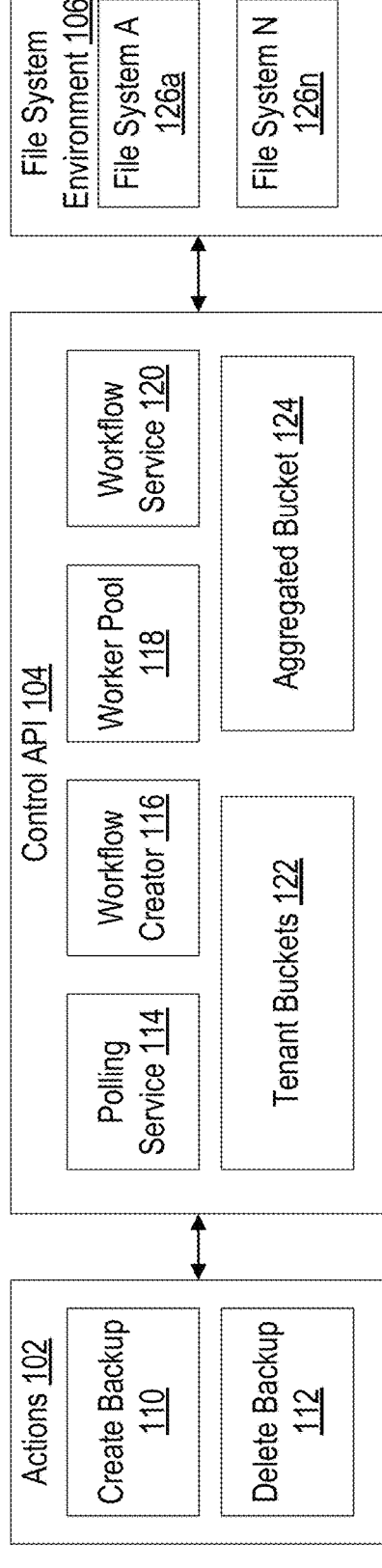
FIG. 1 is a block diagram of a computing environment that can use buckets to prioritize requested actions in a file system environment, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Certain aspects and features of the present disclosure relate to controlling actions in a file system environment using buckets corresponding to priority. In some embodiments, controlling actions can include selectively throttling tenants, for example a host-level throttling, in the file system environment to reduce latency in the file system environment. The actions may include creating a snapshot, such as a backup, of a file system, deleting the snapshot, or the like. In some embodiments, the actions may be automated such that one or more tenants having a file system included in the file system environment may schedule one or more future actions to be taken for a corresponding file system. For example, a snapshot generation and/or a snapshot deletion may be requested by a particular tenant to be performed regularly and/or periodically. A control application programming interface (control API) may control the actions that may be performed by the file system environment based at least in part on the buckets. The buckets may include a first bucket, such as an aggregated bucket, and a set of second buckets such as a set of tenant-specific buckets. Each bucket may be a digital representation of capacity corresponding to the file system environment (e.g., with respect to the aggregated bucket), corresponding to a particular tenant (e.g., with respect to a particular tenant bucket of the set of tenant-specific buckets), etc. Additionally or alternatively, each bucket may include a set of tokens that may indicate a remaining capacity corresponding to the file system environment and/or to the particular tenant. Performing an action may cause one or more tokens to be consumed. For example, if the file system environment performs an action for the particular tenant, then at least one token may be consumed from the aggregated bucket or from the corresponding tenant-specific bucket. Additionally or alternatively, the set of tenant-specific buckets may be prioritized such that a first maximum number of tokens in a first tenant-specific bucket may be different than a second maximum number of tokens in a second tenant-specific bucket based at least in part on a priority of the corresponding tenants.

In some embodiments, a file system environment may be provided by a service-providing entity. The service-providing entity may have or otherwise use a computer server, a set of computer servers, a cloud-based environment, or the like to provide the file system environment and/or any services provided via the file system environment. In a particular example, the service-providing entity can provide the file system environment for a set of tenants, which may include one or more tenants. A tenant may be assigned or otherwise provided a tenant-specific file system within the file system environment. The tenant may use the tenant-specific file system to store data, to analyze data, or for other suitable purposes. In a particular example, the tenant may use the tenant-specific file system to maintain data and/or backups for interaction data, for log data, or for other suitable data that the tenant may generate, receive, and/or use. The tenant may be requested to generate and/or maintain full or partial backups of data stored and/or used in the tenant-specific file system. The service-providing entity may provide a snapshot service that can automatically, periodically, or the like generate a full or partial backup of data included in the tenant-specific file system. Additionally or alternatively, the snapshot service may be configured to generate a snapshot, to delete a snapshot, or the like in an automated configuration. For example, the snapshot service may receive a request from the tenant to schedule periodic, or continuous, snapshot generation actions and/or snapshot deletion actions, for example to reduce manual interactions by the tenant requested by the file system environment.

The file system environment may provide more than one file system for more than one tenant. For example, within the file system environment, two file systems, three file systems, four file systems, five file systems, five hundred file systems, five thousand file systems, or more than five thousand file systems may be provided to one tenant, to two tenants, to three tenants, to four tenants, to five tenants, or to more than five tenants. In some embodiments, one or more tenants may have more than one file system. In other examples, the tenants and the file systems within the file system environment may be in one-to-one correspondence. The file system environment may receive a set of requests from a set of tenants having at least one file system included in the file system environment. The set of requests may be or include a request to periodically generate a snapshot of a corresponding file system, to periodically delete a snapshot of a corresponding file system, or a combination thereof. In some embodiments, a computing demand associated with the set of requests may exceed a computing capacity of the file system environment. In a particular example, the file system environment may have a computing capacity able to generate 10,000 snapshots in a particular hour of time, whereas the set of requests may involve generating 11,000 snapshots in the particular hour of time. If the file system environment attempts to generate the 11,000 snapshots in the particular hour of time, the file system environment may experience latency and may fail to fulfill each request submitted by the set of tenants. In another example, the file system environment may experience a noisy neighbor situation. The noisy neighbor situation may involve a particular tenant having an excessive number of file systems and requesting an action for each of the file systems, or a large subset thereof, such that other file systems associated with other, sometimes smaller, tenants experience significant latency or delays in having their requests fulfilled.

Controlling actions in the file system environment using buckets can address the above-identified technical problems. For example, each tenant can be assigned a tenant-specific bucket, and once tokens run out of the tenant-specific bucket, actions may not be performed for a corresponding tenant until the tenant-specific bucket is refilled. In this way, the file system environment can prevent excessively large tenants from preventing smaller tenants from receiving requested services. Additionally or alternatively, the tenant-specific buckets can be prioritized by assigning differing numbers of maximum tokens to the tenant-specific buckets. For example, a larger tenant may receive a larger number of tokens than a smaller tenant based at least in part on a number of file systems associated with the larger tenant, based at least in part on an amount of resources provided by the larger tenant to the service-providing entity for using the file system environment, or the like. By prioritizing the tenant-specific buckets, the file system environment can ensure that actions are performed commensurate with a priority of corresponding tenants.

In a particular example, the file system environment, or a control API thereof or associated therewith, can receive a set of requests to perform actions for a set of file systems included in the file system environment. The set of requests may originate from a set of tenants that are associated with the set of file systems. Additionally or alternatively, each request of the set of requests may involve a request to perform an action, such as generating or deleting a snapshot, and a schedule for which to perform the action. The file system environment, or the control API, may generate an aggregated bucket and a set of tenant-specific buckets. In other examples, the file system environment, or the control API, may access an existing aggregated bucket and/or access an existing set of tenant-specific buckets. If the accessed buckets are not populated with tokens, the file system environment, or the control API, may populate the accessed buckets based at least in part on a computing capacity of the file system environment and/or a priority of corresponding tenants of the set of tenants. For example, the file system environment, or the control API, may populate the aggregated bucket with a number of tokens corresponding to a number of actions, or any subset thereof, that can be performed by the file system environment in a predetermined amount of time. Additionally or alternatively, the file system environment, or the control API, may populate each tenant-specific bucket with a number of tokens corresponding to a priority of the corresponding tenant such that the number of tokens may indicate a number of actions allowed to be performed on behalf of the corresponding tenant in the predetermined amount of time.

For each request of the set of requests, the file system environment, or the control API, may access a particular tenant-specific bucket corresponding to a particular tenant associated with the request. The file system environment, or the control API, may determine whether there are a sufficient number of tokens to perform the request. If there are a sufficient number of tokens, then the file system environment, or the control API, may cause one or more actions indicated by the request to be performed and may consume one or more tokens based on the one or more actions being performed such that the one or more tokens are in one-to-one correspondence with the one or more actions. For example, if 25 actions are performed based on the request, then 25 tokens may be consumed or otherwise deducted from the particular tenant-specific bucket. Additionally or alternatively, the same or similar number of tokens may be consumed or otherwise deducted from the aggregated bucket to indicate that at least a portion of the computing capacity of the file system environment is occupied or otherwise used.

In an example in which the file system environment, or the control API, determines that there are not a sufficient number of tokens to perform the request, then the file system environment, or the control API, may determine whether the aggregated bucket includes a sufficient number of tokens to perform the request. If there are a sufficient number of tokens, then the file system environment, or the control API, may cause one or more actions indicated by the request to be performed and may consume the sufficient number of tokens from the aggregated bucket. If there are not a sufficient number of tokens in the aggregated bucket, then the file system environment, or the control API, may deny the request, may deprioritize the request, may send the request to the back of the queue, or may otherwise delay performing an action associated with the request until the particular tenant-specific bucket and/or the aggregated bucket is refilled with the sufficient number of tokens.

In some embodiments, the aggregated bucket, the set of tenant-specific buckets, or a combination thereof can be refilled with tokens continuously, periodically, or the like. For example, the aggregated bucket, the set of tenant-specific buckets, or a combination thereof can be refilled with tokens every predetermined amount of time such as every minute, every hour, every day, every week, or the like. In another example, the aggregated bucket, the set of tenant-specific buckets, or a combination thereof can be refilled with tokens every second, every millisecond, every microsecond, or the like. In a particular example, a bucket may be scheduled to receive 240 tokens per hour, and, instead of providing 240 tokens once an hour elapses, the bucket may receive four tokens each elapsed minute, may receive approximately 0.067 tokens per elapsed second, or the like. The aggregated bucket and/or the set of tenant-specific buckets may not have a number of tokens exceeding a corresponding maximum number of tokens.

FIG. 1 is a block diagram of a computing environment 100 that can use buckets to prioritize requested actions in a file system environment 106, according to at least one embodiment. As illustrated in FIG. 1, the computing environment 100 can include actions 102, a control application programming interface (control API) 104, and the file system environment 106, though the computing environment 100 may include any additional or alternative components or features for using buckets to prioritize requested actions in the file system environment 106. The actions 102 may be or include possible actions that the file system environment 106, or the control API 104, can perform or can otherwise cause to be performed. As illustrated in FIG. 1, the actions 102 can include create backup 110 and delete backup 112, though other suitable actions may be possible within the computing environment 100. In some examples, the create backup 110 action may be or include generating a snapshot of a particular file system on behalf of a corresponding tenant, and the delete backup 112 action may be or include deleting the snapshot of the particular file system on behalf of the corresponding tenant.

The control API 104 can control the actions 102 performed with respect to the file system environment 106. The control API 104 may include or otherwise be communicatively coupled with one or more different services, which may include a polling service 114, a workflow creator 116, a worker pool 118, and a workflow service 120. The control API 104 can include any additional or alternative services, algorithms, models, or the like to provide functionality for the control API 104, the file system environment 106, or the like. The polling service 114 can be used by the control API 104 to poll one or more queues with respect to the file system environment 106. For example, the control API 104 can use the polling service 114 to receive one or more requests, to organize the one or more requests, to analyze the one or more requests, or the like. In a particular example, the control API 104 can use the polling service 114 to receive a set of requests from one or more tenants having at least one file system within the file system environment 106. The set of requests can include requests to perform one or more actions, such as the actions 102, and each request of the set of requests may include or otherwise indicate a future time or set of times at which to perform a corresponding action. In a particular example, the control API 104 can use the polling service 114 to receive a particular request from a particular tenant in which the particular request includes a request to perform a create snapshot action every two hours for a particular file system within the file system environment 106. Other examples of requests received by the control API 104 via the polling service 114 are possible.

The control API 104 can use the workflow creator 116 to generate one or more workflows based at least in part on the set of requests received via the polling service 114. For example, the control API 104 can use the workflow creator 116 to arrange an order in which to execute the set of requests. The workflow creator 116 may generate an execution list that can indicate the order in which to execute the set of requests. In some examples, the workflow creator 116 can determine whether to include each request of the set of requests or to exclude at least a subset of the set of requests. The control API 104 may use the workflow creator 116 and buckets, such as tenant buckets 122 and an aggregated bucket 124, to generate the execution list. For example, the control API 104 may access the tenant buckets 122 and the aggregated bucket 124, and, based at least in part on a number of tokens remaining in the tenant buckets 122 and/or the aggregated bucket 124, the control API 104, via the workflow creator 116, may determine which requests of the set of requests to allow and to include in the execution list.

The tenant buckets 122 may include a set of tenant-specific buckets, and each tenant-specific bucket may correspond to a different tenant having at least one file system included in the file system environment 106. The tenant-specific bucket may be populated with, or may otherwise have a maximum number of, tokens that can be used to facilitate actions with respect to the corresponding file system. In examples in which the tenant buckets 122 are each populated by the control API 104, the control API 104 may populate each tenant bucket of the tenant buckets 122 equally (e.g., with equal numbers of tokens), or based on a priority of a corresponding tenant (e.g., tenants with higher priority values may have more tokens populated in a corresponding bucket compared to other tenants with lower priority values). Each token included in the tenant-specific bucket may be in one-to-one correspondence with a potential action to be taken on behalf of a corresponding tenant. In a particular example, if the tenant-specific bucket includes 100 tokens, then at least 100 actions may be facilitated on behalf of the corresponding tenant, and for each action taken on behalf of the corresponding tenant, a token may be consumed or otherwise deducted from the tenant-specific bucket. The aggregated bucket 124 may be or include a bucket having a maximum number of tokens corresponding to a computational capacity of the file system environment 106 or worker nodes included therein. For example, the control API 104, or any other suitable component of the computing environment 100, may populate the aggregated bucket 124 with the maximum number of tokens based at least in part on a maximum number of actions, or a lesser number of actions to further reduce a likelihood of experiencing latency, that the file system environment 106, or the worker nodes thereof, can perform in a predetermined amount of time. In a particular example, the aggregated bucket 124 may have a maximum number of tokens of approximately 10,000 tokens that indicates that the file system environment 106 can support or otherwise facilitate approximately 10,000 actions in the predetermined amount of time. Additionally or alternatively, for each action performed within the file system environment 106 within the predetermined amount of time, a token may be consumed or otherwise deducted from the aggregated bucket 124 indicating that at least a portion of the computational capacity of the file system environment 106 is used or planned to be used.

In some embodiments, the control API 104 can use the workflow creator 116 to access the tenant buckets 122 and/or the aggregated bucket 124 to determine if there is computational capacity to perform actions associated with the set of requests. For example, the control API 104 may identify a particular request from a particular tenant, and the control API 104 may access a corresponding tenant-specific bucket of the tenant buckets 122. The control API 104 can determine whether the corresponding tenant-specific bucket includes sufficient numbers of tokens to perform the particular request. If the control API 104 determines that there are a sufficient number of tokens, then the control API 104 may use the workflow creator 116 to generate an execution list, or adjust an existing execution list, that includes actions associated with the particular request. If the control API 104 determines that there are not a sufficient number of tokens, the control API 104 may prevent actions associated with the request from being performed. In other examples, if the control API 104 determines that there are not a sufficient number of tokens, the control API 104 may access the aggregated bucket 124 to determine if a sufficient number of tokens are included in the aggregated bucket 124 to perform the actions associated with the particular request. If the control API 104 determines that there are a sufficient number of tokens in the aggregated bucket 124, then the control API 104 may use the workflow creator 116 to generate an execution list, or adjust an existing execution list, that includes actions associated with the particular request. If the control API 104 determines that there are not a sufficient number of tokens in the corresponding tenant-specific bucket and the aggregated bucket 124, the control API 104 may prevent actions associated with the request from being performed. Preventing the actions may involve delaying the actions until a sufficient number of tokens are present in the corresponding tenant-specific bucket and/or the aggregated bucket 124, may involve denying the request and causing the tenant to resubmit the particular request, or the like.

In response to using the workflow creator 116 to access and/or analyze the tenant buckets 122 and/or the aggregated bucket 124, to generate the execution list, and the like, the control API 104 can use the worker pool 118 to schedule execution of the execution list or to otherwise schedule actions to be performed with respect to the file system environment 106. The worker pool 118 can include indications of available worker nodes within or otherwise associated with the file system environment 106. The available worker nodes may be configured to receive instructions, for example from the control API 104 or other suitable source with respect to the computing environment 100, and to execute the instructions to perform the actions. In a particular example, the control API 104 may identify a set of worker nodes using the worker pool 118, and the control API 104 may transmit the execution list to the set of worker nodes to cause the actions included in the execution list to be performed by the worker nodes with respect to the file system environment 106. In some embodiments, the control API 104 may identify the set of worker nodes using the worker pool 118 and may schedule an order in which to transmits the actions of the execution list to the set of workers using the workflow service 120. The workflow service 120 may allow the control API 104 to carry out the execution list to perform the actions within the file system environment 106. For example, the control API 104 can execute the workflow service 120 to cause the execution list to be transmitted to the set of worker nodes, which can execute the actions in the file system environment 106. The control API 104 can maintain a continuous version of the execution list to be continuously shared with the worker nodes via the workflow service 120. In other examples, the control API 104 may execute the services described above periodically, for example every minute, every hour, every day, etc., to provide discrete versions of the execution list to the set of worker nodes for each predetermined amount of time.

The control API 104 can execute the workflow service 120 to transmit the execution list to the set of worker nodes, or otherwise to the file system environment 106, to cause actions indicated by the execution list to be performed with respect to the file system environment 106. The file system environment 106 may include a set of file systems, which may be maintained separately from one another, adjacent to one another (e.g., if a common tenant is associated with adjacent file systems), etc. For example, the file system environment 106 may include file system A 126a and file system N 126n, which can represent an unbounded (e.g., two file systems, three file systems, four file systems, or more than four file systems) number of file systems. The file system environment 106, or worker nodes associated therewith, may receive the execution list and may begin to perform actions indicated by the execution list. For example, a first worker node may identify a first action to perform in which the first action involves generating a snapshot for the file system A 126a. The first worker node may generate the snapshot and may proceed to the next action, which may involve the file system A 126a and/or the file system N 126n. The first worker node may perform actions asynchronously with respect to other worker nodes of the set of worker nodes. For example, the first worker node may perform the first action while a second worker node performs a second action, which may involve the file system A 126a and/or the file system N 126n. In other examples, the set of worker nodes may perform the actions included in the execution list synchronously or otherwise in order.

FIG. 2 is a flowchart of a process 200 to use buckets to prioritize requested actions in a file system environment 106, according to at least one embodiment. In some embodiments, the process 200 may be performed by the control API 104, though other suitable components of the computing environment 100 may additionally or alternatively perform one or more operations associated with the process 200. Additionally, while the operations of the process 200 are described in a particular order, the operations are by no means limited to the particular order. The operations may be performed in any other suitable order including at least partially substantially contemporaneously with respect to one another.

At block 202, the process 200 involves receiving requests, such as a set of requests, to perform actions in a file system environment 106. The set of requests may involve one or more requests to generate data backups, such as snapshots, in the file system environment 106. In some examples, each request of the set of requests may be associated with a different tenant of a set of tenants having at least one file system within the file system environment 106. In other examples, one or more requests of the set of requests may be associated with a different tenant of the set of tenants. The set of requests may be received by the control API 104, for example via the polling service 114, though other suitable services may be used to receive the set of requests. In some examples, each request of the set of requests may include a request to perform an action, such as generate a snapshot, with an indication of a future time or set of times for which to perform the action.

At block 204, the process 200 involves populating a first bucket, such as the aggregated bucket 124, based at least in part on a computing capacity of the file system environment 106. The aggregated bucket 124 can be populated with a first set of tokens. A number of tokens included in the first set of tokens may correspond to, such as may be approximately equal to, a number of global actions that can be taken by the file system environment 106 within a predetermined amount of time. The predetermined amount of time may include a minute, an hour, a day, a week, or any other suitable predetermined amount of time. The aggregated bucket 124 may be repopulated with the first set of tokens each predetermined amount of time or continuously based on the computing capacity within the predetermined amount of time. In some examples, each token of the first set of tokens may represent a single action that can be taken by the file system environment 106, or any worker node thereof.

At block 206, the process 200 involves populating a set of tenant buckets, such as the tenant buckets 122, associated with the file system environment 106. The tenant buckets 122 may correspond to a set of tenants associated with the file system environment 106. Each tenant of the set of tenants may have or otherwise be associated with one or more file systems included in the file system environment 106. Additionally or alternatively, each tenant bucket of the tenant buckets 122 may be associated with a different tenant of the set of tenants. Each tenant bucket may correspond to a single tenant, may correspond to one or more file systems that are controlled by the single tenant or otherwise associated with the single tenant, and the like. In a particular example, a particular tenant of the set of tenants may have access to 12 different file systems, and a particular tenant bucket of the tenant buckets 122 may correspond to the particular tenant and to the 12 different file systems. Each tenant bucket of the tenant buckets 122 may have a different maximum number of tokens based at least in part on a priority of a corresponding tenant of the set of tenants. For example, a first tenant bucket corresponding to a first tenant having a first priority larger than a second priority may have a larger maximum number of tokens than a maximum number of tokens of a second tenant bucket corresponding to a second tenant having the second priority. Additionally or alternatively, the maximum number of tokens populated into each tenant bucket of the tenant buckets 122 may indicate a maximum allowable number of actions that can be taken on behalf of a corresponding tenant within the file system environment 106. Similarly with the first set of tokens, each token populated into each tenant bucket may represent a single action performable within the file system environment 106 and on behalf of the corresponding tenant.

At block 208, the process 200 involves prioritizing the second buckets, such as the tenant buckets 122, based at least in part on priorities associated with the set of tenants. In some examples, and in response to populating each tenant bucket of the tenant buckets 122 with equal numbers of tokens, the maximum number of tokens for each tenant bucket may be adjusted based on a priority assigned to a corresponding tenant. In a particular example, a particular tenant may have a priority value of 1.1, and the maximum number of tokens for a particular tenant bucket corresponding to the particular tenant may be multiplied by 1.1 to reflect an increase in the priority of the particular tenant bucket. In another example, a particular tenant may have a priority value of 0.4, and the maximum number of tokens for a particular tenant bucket corresponding to the particular tenant may be multiplied by 0.4 to reflect an decrease in the priority of the particular tenant bucket. Other suitable techniques for adjusting the maximum number of tokens based at least in part on a priority of a corresponding tenant are possible. In some embodiments, a priority value may be assigned to a particular tenant based at least in part on a size of the tenant, a number of file systems associated with the tenant, an amount of resources provided by the tenant, or the like.

At block 210, the process 200 involves generating an execution list for executing one or more actions associated with the set of requests. In some embodiments, the execution list can be generated based at least in part on the aggregated bucket 124 and the tenant buckets 122, or based at least in part on a number of tokens included therein. Additionally or alternatively, a subset of the set of requests may be included in, or excluded from, the execution list based at least in part on a number of tokens remaining in the tenant buckets 122 and/or the aggregated bucket 124.

In some embodiments, a particular request of the set of requests and a particular tenant of the set of tenants associated with the particular request can be identified. A first number of tokens remaining in a particular tenant bucket of the tenant buckets 122 associated with the particular tenant can be determined. In response to determining that the first number of tokens is greater than zero, one or more actions associated with the particular request can be added to the execution list or can otherwise be facilitated to be performed with respect to the file system environment 106. In response to determining that the first number of tokens is zero or less than zero, the one or more actions associated with the particular request can be prevented from being performed, can be delayed from being performed, or may otherwise be excluded from the execution list. In some embodiments, if zero or less than zero tokens remain in the particular tenant bucket, and if zero, less than zero, or an otherwise insufficient number of tokens remain in the aggregated bucket 124, then the one or more actions may be denied, delayed, or otherwise excluded from the execution list. In other examples, if zero or less than zero tokens remain in the particular tenant bucket, and if a sufficient number of tokens remain in the aggregated bucket 124, then the one or more actions may be included in the execution list or may otherwise be facilitated to be performed.

At block 212, the process 200 involves executing the execution list based at least in part on the aggregated bucket 124 and the tenant buckets 122. In some embodiments, the execution list can be executed based at least in part on a first number of tokens remaining in the aggregated bucket 124 and a second number of tokens remaining the tenant buckets 122. The execution list may be provided to the file system environment 106, or to one or more worker nodes included in or associated with the file system environment 106. The file system environment 106 may execute, or facilitate execution of, the execution list by facilitating performing actions, such as generating a snapshot and/or deleting a snapshot, in the file system environment 106. In response to performing an action, at least one token may be consumed or otherwise deducted from the particular tenant bucket, from the aggregated bucket 124, or from a combination thereof. For example, if a sufficient number of tokens remains in the particular tenant bucket, then one or more actions may be performed on behalf of the particular tenant corresponding to the particular tenant bucket, and one or more tokens may be consumed from or otherwise deducted from the particular tenant bucket. A first number of actions of the one or more actions may be approximately equal to a second number of tokens of the one or more tokens. Additionally or alternatively, the one or more tokens may be consumed from or otherwise deducted from the aggregated bucket 124 to indicate that computing capacity is being used with respect to the file system environment 106. In another example, if an insufficient number of tokens remains in the particular tenant bucket, but a sufficient number of tokens remains in the aggregated bucket 124, then the one or more actions may be performed and the one or more tokens may be consumed from or otherwise deducted from the aggregated bucket 124.

In some examples, the tenant buckets 122 and the aggregated bucket 124 may be refilled with tokens as time progresses. For each predetermined period of time, such as every minute, every hour, every two hours, every day, every two days, every week, and the like, the tenant buckets 122 and/or the aggregated bucket 124 may be assigned a predetermined number of tokens. Each tenant bucket of the tenant buckets 122 and/or the aggregated bucket 124 may be continuously refilled, may be periodically refilled, or the like. For example, if the predetermined period of time is one day, then at the beginning, middle, end, or any portion between the beginning and the end, of each day, each tenant bucket and/or the aggregated bucket 124 may receive the predetermined number of tokens. In other examples, the predetermined number of tokens may be averaged over the predetermined period of time such that each tenant bucket and/or the aggregated bucket 124 may be continuously refilled with the averaged number of tokens. The predetermined number of tokens may correspond to an expected future computation capacity of the file system environment 106 (e.g., for the aggregated bucket 124), may correspond at least to a priority of a corresponding tenant (e.g., for the tenant buckets 122), or the like.

FIG. 3 is a flowchart of a process 300 to use buckets to ensure fairness with respect to tenants in a file system environment 106, according to at least one embodiment. In some embodiments, the process 300 may be performed by the control API 104, though other suitable components of the computing environment 100 may additionally or alternatively perform one or more operations associated with the process 300. Additionally, while the operations of the process 300 are described in a particular order, the operations are by no means limited to the particular order. The operations may be performed in any other suitable order including at least partially substantially contemporaneously with respect to one another.

At block 302, the process 300 involves receiving requests, such as a set of requests, to perform actions in a file system environment 106. The set of requests may involve one or more requests to generate data backups, such as snapshots, in the file system environment 106. In some examples, each request of the set of requests may be associated with a different tenant of a set of tenants having at least one file system within the file system environment 106. In other examples, one or more requests of the set of requests may be associated with a different tenant of the set of tenants. The set of requests may be received by the control API 104, for example via the polling service 114, though other suitable services may be used to receive the set of requests. In some examples, each request of the set of requests may include a request to perform an action, such as generate a snapshot, with an indication of a future time or set of times for which to perform the action.

At block 304, the process 300 involves populating a first bucket, such as the aggregated bucket 124, based at least in part on a computing capacity of the file system environment 106. The aggregated bucket 124 can be populated with a first set of tokens. A number of tokens included in the first set of tokens may correspond to, such as may be approximately equal to, a number of global actions that can be taken by the file system environment 106 within a predetermined amount of time. The predetermined amount of time may include a minute, an hour, a day, a week, or any other suitable predetermined amount of time. The aggregated bucket 124 may be repopulated with the first set of tokens each predetermined amount of time or continuously based on the computing capacity within the predetermined amount of time. In some examples, each token of the first set of tokens may represent a single action that can be taken by the file system environment 106, or any worker node thereof.

At block 306, the process 300 involves populating a set of tenant buckets, such as the tenant buckets 122, associated with the file system environment 106. The tenant buckets 122 may correspond to a set of tenants associated with the file system environment 106. Each tenant of the set of tenants may have or otherwise be associated with one or more file systems included in the file system environment 106. Additionally or alternatively, each tenant bucket of the tenant buckets 122 may be associated with a different tenant of the set of tenants. Each tenant bucket may correspond to a single tenant, may correspond to one or more file systems that are controlled by the single tenant or otherwise associated with the single tenant, and the like. In a particular example, a particular tenant of the set of tenants may have access to 12 different file systems, and a particular tenant bucket of the tenant buckets 122 may correspond to the particular tenant and to the 12 different file systems. Each tenant bucket of the tenant buckets 122 may have a different maximum number of tokens based at least in part on a priority of a corresponding tenant of the set of tenants. For example, a first tenant bucket corresponding to a first tenant having a first priority larger than a second priority may have a larger maximum number of tokens than a maximum number of tokens of a second tenant bucket corresponding to a second tenant having the second priority. Additionally or alternatively, the maximum number of tokens populated into each tenant bucket of the tenant buckets 122 may indicate a maximum allowable number of actions that can be taken on behalf of a corresponding tenant within the file system environment 106. Similarly with the first set of tokens, each token populated into each tenant bucket may represent a single action performable within the file system environment 106 and on behalf of the corresponding tenant.

At block 308, the process 300 involves equalizing tokens included in the tenant buckets 122. In some examples, and in response to populating each tenant bucket of the tenant buckets 122 with tokens, the maximum number of tokens for each tenant bucket may be equalized between the set of tenant. In a particular example, a priority value of each tenant of the set of tenants may be set to 1 or otherwise set to equal values. In other examples, the maximum numbers of tokens for the set of tenants may be equalized such that the maximum numbers correspond to a size of the corresponding tenants. For example, larger tenants may have larger maximum numbers of tokens, or the like such that normalized maximum numbers of tokens with respect to a size of the corresponding tenants are approximately equal with respect to one another. Other suitable techniques for equalizing the maximum number of tokens among the set of tenants are possible. Equalizing the maximum number of tokens among the set of tenants may ensure fairness within the file system environment 106 such that no one tenant overpowers or otherwise hoards computing capacity in the file system environment 106 at the expense (e.g., latency) of other tenants.

At block 310, the process 300 involves generating an execution list for executing one or more actions associated with the set of requests. In some embodiments, the execution list can be generated based at least in part on the aggregated bucket 124 and the tenant buckets 122, or based at least in part on a number of tokens included therein. Additionally or alternatively, a subset of the set of requests may be included in, or excluded from, the execution list based at least in part on a number of tokens remaining in the tenant buckets 122 and/or the aggregated bucket 124.

In some embodiments, a particular request of the set of requests and a particular tenant of the set of tenants associated with the particular request can be identified. A first number of tokens remaining in a particular tenant bucket of the tenant buckets 122 associated with the particular tenant can be determined. In response to determining that the first number of tokens is greater than zero, one or more actions associated with the particular request can be added to the execution list or can otherwise be facilitated to be performed with respect to the file system environment 106. In response to determining that the first number of tokens is zero or less than zero, the one or more actions associated with the particular request can be prevented from being performed, can be delayed from being performed, or may otherwise be excluded from the execution list. In some embodiments, if zero or less than zero tokens remain in the particular tenant bucket, and if zero, less than zero, or an otherwise insufficient number of tokens remain in the aggregated bucket 124, then the one or more actions may be denied, delayed, or otherwise excluded from the execution list. In other examples, if zero or less than zero tokens remain in the particular tenant bucket, and if a sufficient number of tokens remain in the aggregated bucket 124, then the one or more actions may be included in the execution list or may otherwise be facilitated to be performed.

At block 312, the process 300 involves executing the execution list based at least in part on the aggregated bucket 124 and the tenant buckets 122. In some embodiments, the execution list can be executed based at least in part on a first number of tokens remaining in the aggregated bucket 124 and a second number of tokens remaining the tenant buckets 122. The execution list may be provided to the file system environment 106, or to one or more worker nodes included in or associated with the file system environment 106. The file system environment 106 may execute, or facilitate execution of, the execution list by facilitating performing actions, such as generating a snapshot and/or deleting a snapshot, in the file system environment 106. In response to performing an action, at least one token may be consumed or otherwise deducted from the particular tenant bucket, from the aggregated bucket 124, or from a combination thereof. For example, if a sufficient number of tokens remains in the particular tenant bucket, then one or more actions may be performed on behalf of the particular tenant corresponding to the particular tenant bucket, and one or more tokens may be consumed from or otherwise deducted from the particular tenant bucket. A first number of actions of the one or more actions may be approximately equal to a second number of tokens of the one or more tokens. Additionally or alternatively, the one or more tokens may be consumed from or otherwise deducted from the aggregated bucket 124 to indicate that computing capacity is being used with respect to the file system environment 106. In another example, if an insufficient number of tokens remains in the particular tenant bucket, but a sufficient number of tokens remains in the aggregated bucket 124, then the one or more actions may be performed and the one or more tokens may be consumed from or otherwise deducted from the aggregated bucket 124.

In some examples, the tenant buckets 122 and the aggregated bucket 124 may be refilled with tokens as time progresses. For each predetermined period of time, such as every minute, every hour, every two hours, every day, every two days, every week, and the like, the tenant buckets 122 and/or the aggregated bucket 124 may be assigned a predetermined number of tokens. Each tenant bucket of the tenant buckets 122 and/or the aggregated bucket 124 may be continuously refilled, may be periodically refilled, or the like. For example, if the predetermined period of time is one day, then at the beginning, middle, end, or any portion between the beginning and the end, of each day, each tenant bucket and/or the aggregated bucket 124 may receive the predetermined number of tokens. In other examples, the predetermined number of tokens may be averaged over the predetermined period of time such that each tenant bucket and/or the aggregated bucket 124 may be continuously refilled with the averaged number of tokens. The predetermined number of tokens may correspond to an expected future computation capacity of the file system environment 106 (e.g., for the aggregated bucket 124), may correspond at least to a priority of a corresponding tenant (e.g., for the tenant buckets 122), or the like.

Figure 4:
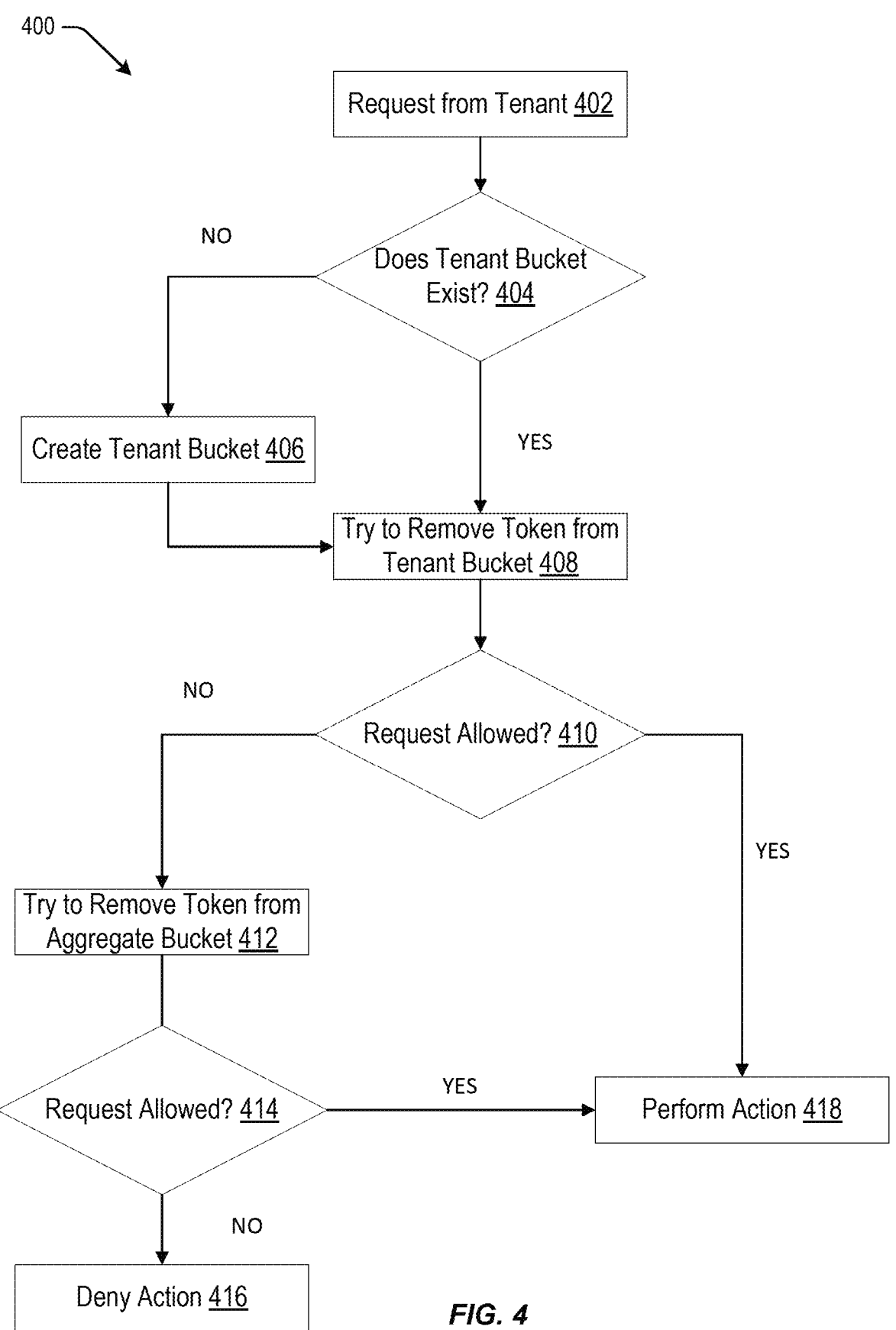
FIG. 4 is a block diagram of a decision flow with respect to using buckets to prioritize requested actions in a file system environment, according to at least one embodiment.

FIG. 4 is a block diagram of a decision flow 400 with respect to using buckets to prioritize requested actions in a file system environment 106, according to at least one embodiment. In some embodiments, the control API 104 may perform the operations described with respect to the decision flow 400, though other components of the computing environment 100 may additionally or alternatively perform one or more operations described with respect to the decision flow 400. As illustrated in FIG. 4, the decision flow 400 may begin by receiving a request 402 from a tenant. The tenant may have or otherwise be associated with a file system included in a file system environment 106. The request may include a request for performing at least one action, such as generating a snapshot of the file system, deleting a snapshot of the file system, or the like, and may include an indication of when to perform the action, how often to perform the action, etc. The control API 104 may, at decision point 404, determine whether a tenant-specific bucket, such as a tenant-specific bucket of the tenant buckets 122, exists for the tenant. If the tenant-specific bucket does not exist, then at action 406, the control API 104 can generate a tenant-specific bucket for the tenant or can otherwise facilitate generation of the tenant-specific bucket. If the control API 104 determines that the tenant-specific bucket exists, or in response to generating or facilitating generation of the tenant-specific bucket, the control API 104, at action 408, can try to remove a token from the tenant-specific bucket in return for performing the requested action associated with the received request.

At decision point 410, the control API 104 can access the tenant-specific bucket and can determine whether a sufficient number of tokens remains in the tenant-specific bucket. If the request involves performing a single action, then the control API 104 may determine whether the tenant-specific bucket includes at least one token. If the request involves performing more than one action, then the control API 104 may determine whether the tenant-specific bucket includes a sufficient number of tokens to cover the more than one action such that each token may be in one-to-one correspondence with a single action. If, at the decision point 410, the control API 104 determines that the tenant-specific bucket does not include a sufficient number of tokens, then the control API 104 may access the aggregated bucket 124 and, at action 412, the control API 104 may attempt to use tokens included in the aggregated bucket 124 to perform the requested actions. For example, the control API 104 can access the aggregated bucket 124 and can determine, at decision point 414, a number of tokens remaining in the aggregated bucket 124. If the number of tokens is less than a number of actions requested to be performed by the received request, then the control API 104 may, at action 416, deny the request, for example by delaying the one or more actions, by excluding the one or more actions from an execution plan, or the like. If, at the decision point 414, the control API 104 determines that the number of tokens remaining in the aggregated bucket 124 is greater than or equal to a number of actions requested via the received request, or if, at the decision point 410, the control API 104 determines that the tenant-specific bucket includes a sufficient number of tokens, then the control API 104 may cause the one or more actions to be performed at action 418 and may consume or deduct the corresponding number of tokens from the tenant-specific bucket and/or the aggregated bucket 124.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to be set up first. In some instances, the provisioning can be done manually, a provisioning tool may be utilized to provision the resources, and/or deployment tools may be utilized to deploy the code once the infrastructure is provisioned.

Figure 5:
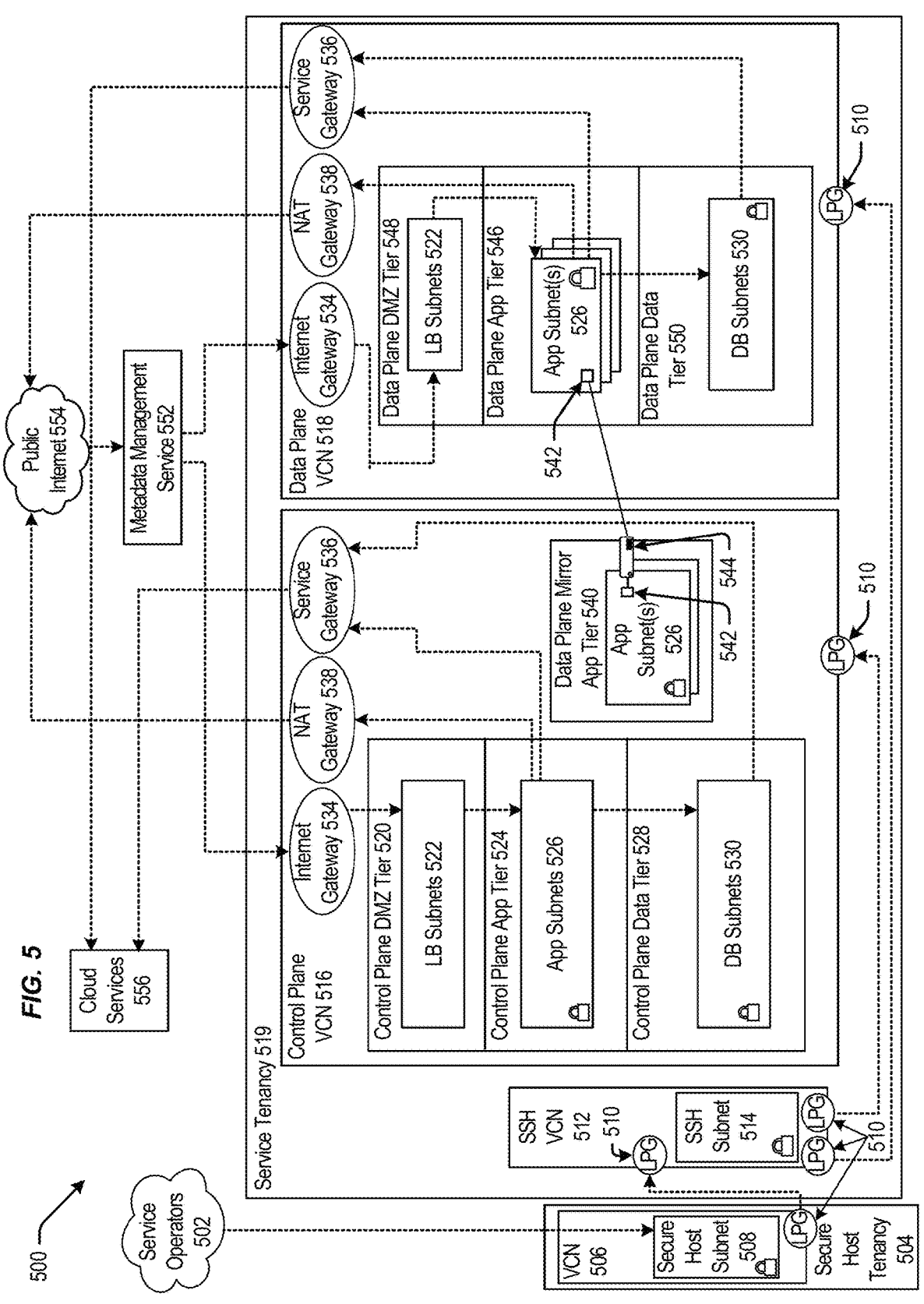
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively coupled to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
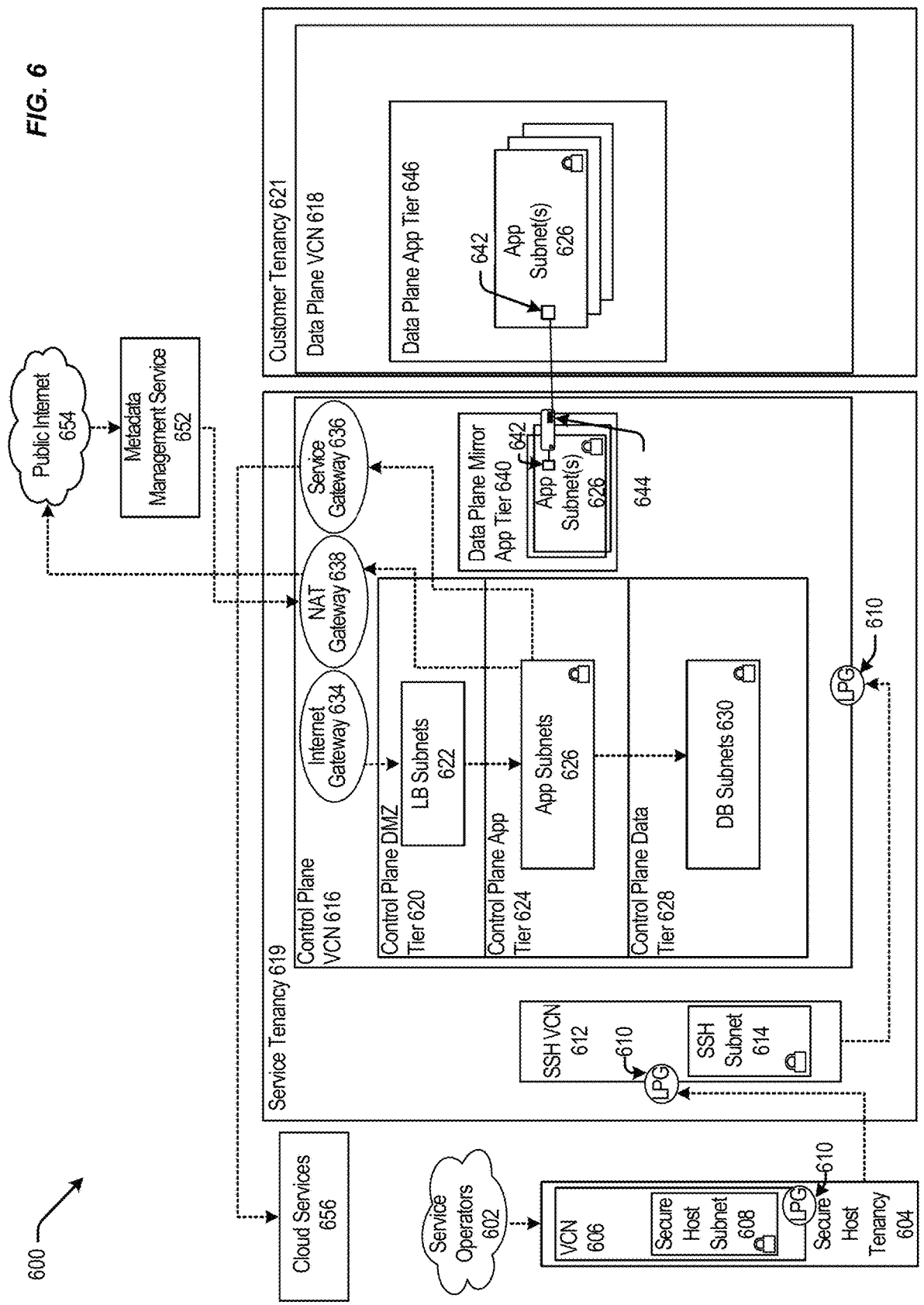
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively coupled to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
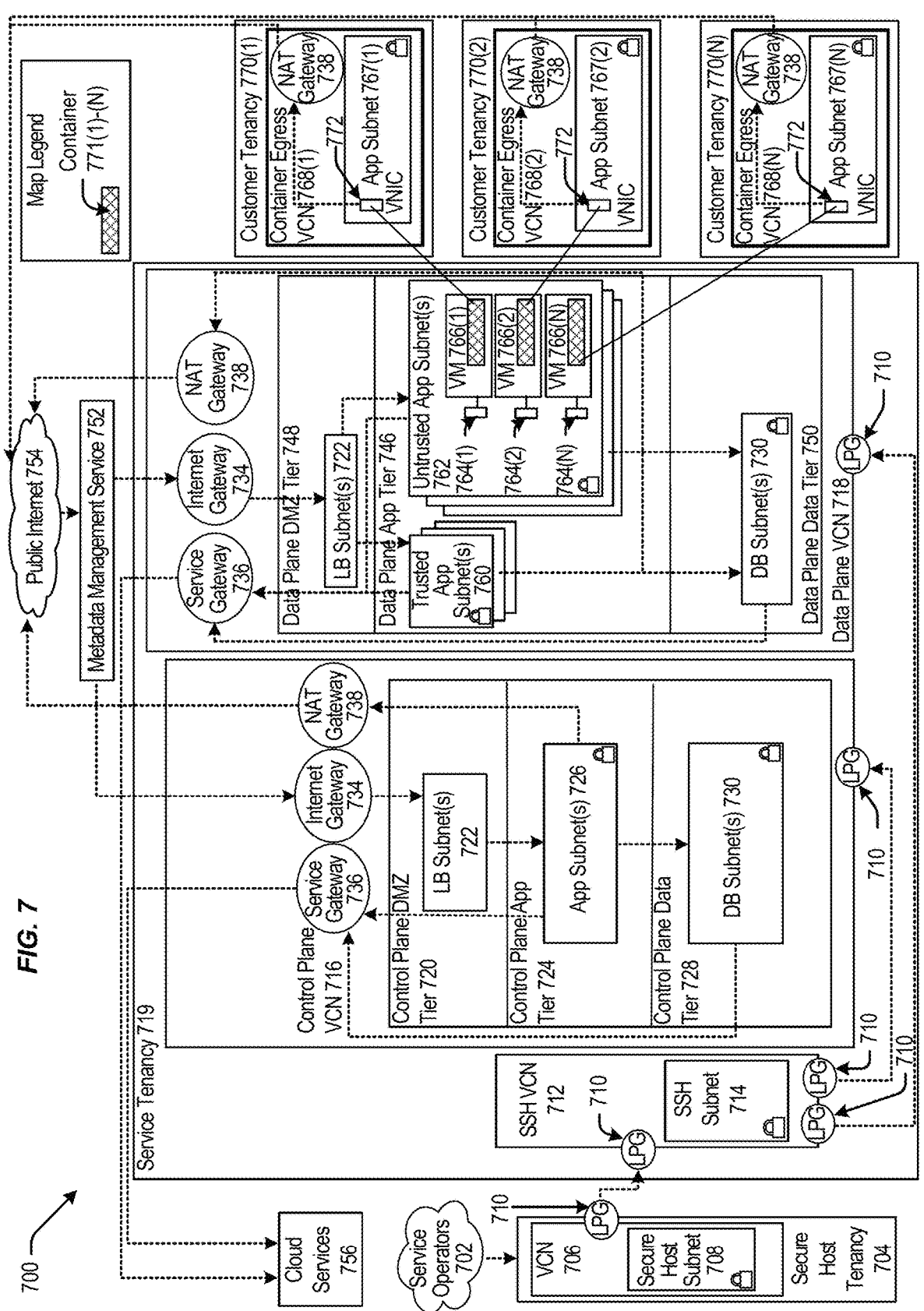
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively coupled to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
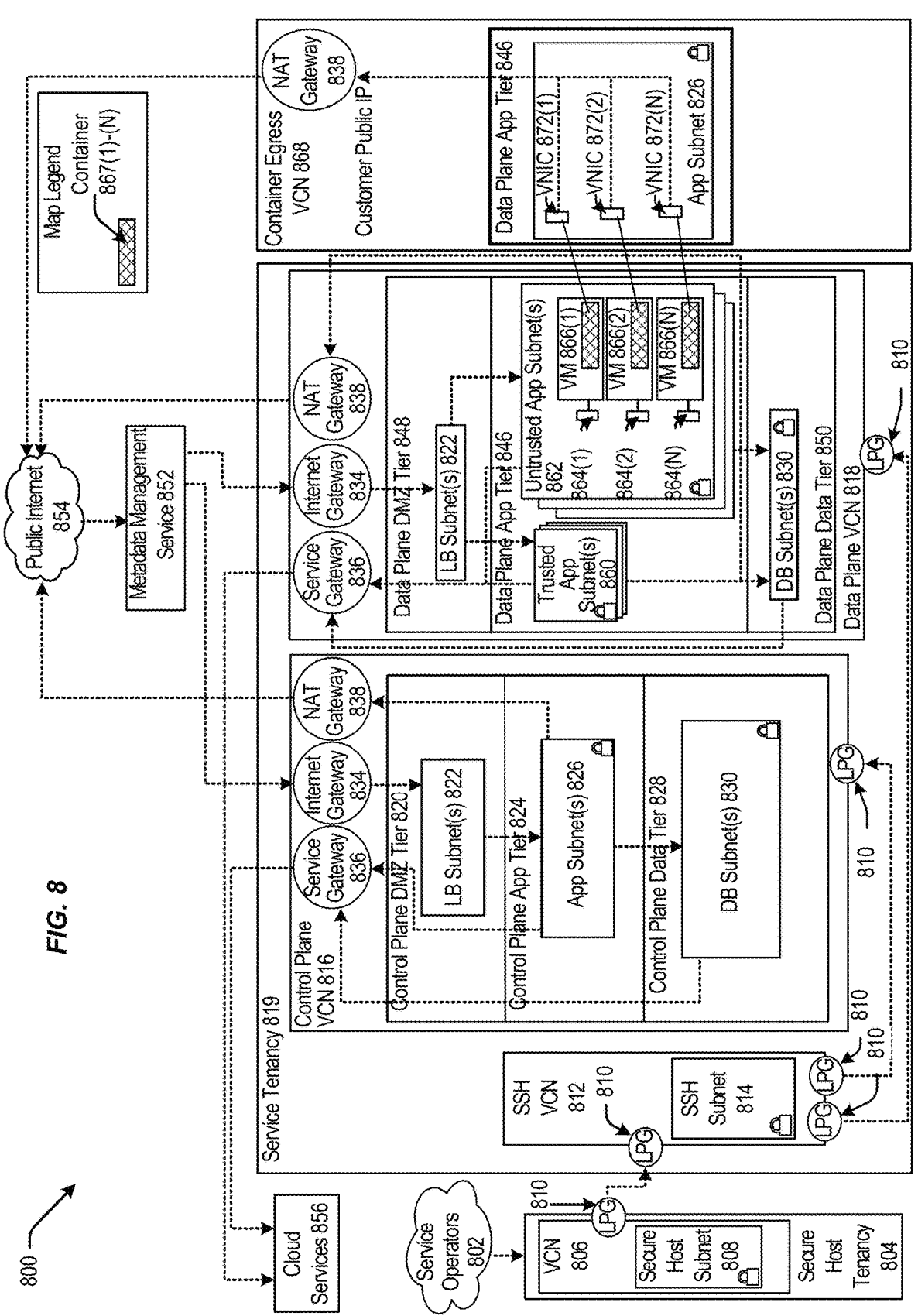
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and can be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively coupled to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
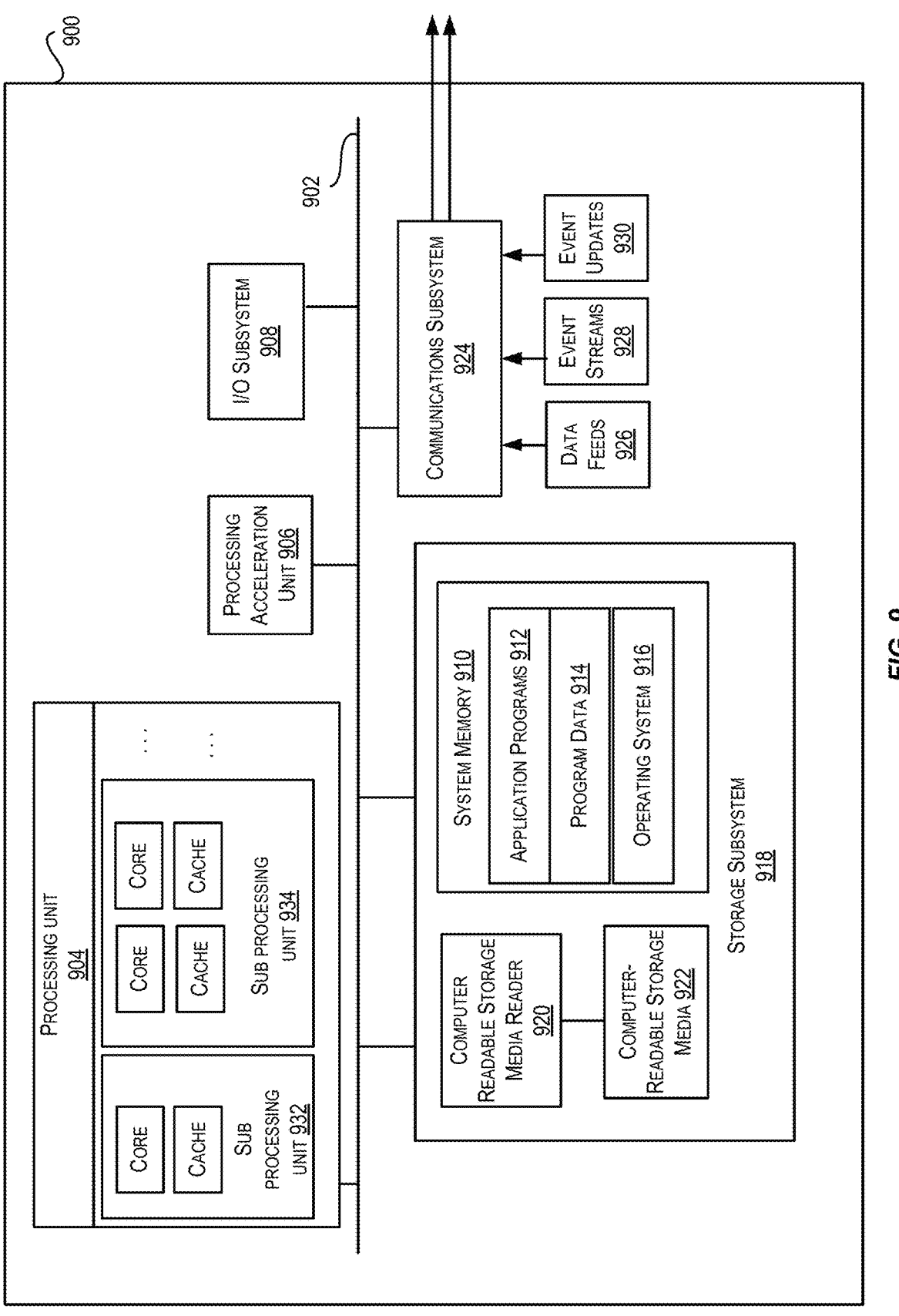
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 904 provide the functionality described above. Storage subsystem 918 may also provide a repository for storing data used in accordance with the present disclosure.

As depicted in the example in FIG. 9, storage subsystem 918 can include various components including a system memory 910, computer-readable storage media 922, and a computer readable storage media reader 920. System memory 910 may store program instructions that are loadable and executable by processing unit 904. System memory 910 may also store data that is used during the execution of the instructions and/or data that is generated during the execution of the program instructions. Various different kinds of programs may be loaded into system memory 910 including but not limited to client applications, Web browsers, mid-tier applications, relational database management systems (RDBMS), virtual machines, containers, etc.

System memory 910 may also store an operating system 916. Examples of operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 900 executes one or more virtual machines, the virtual machines along with their guest operating systems (GOSs) may be loaded into system memory 910 and executed by one or more processors or cores of processing unit 904.

System memory 910 can come in different configurations depending upon the type of computer system 900. For example, system memory 910 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 910 may include a basic input/output system (BIOS) containing basic routines that help to transfer information between elements within computer system 900, such as during start-up.

Computer-readable storage media 922 may represent remote, local, fixed, and/or removable storage devices plus storage media for temporarily and/or more permanently containing, storing, computer-readable information for use by computer system 900 including instructions executable by processing unit 904 of computer system 900.

Computer-readable storage media 922 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Machine-readable instructions executable by one or more processors or cores of processing unit 904 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:

populating, by a computing system, a first bucket with a first set of tokens, the first bucket associated with global actions of a file system environment;

populating, by the computing system, each second bucket of a plurality of second buckets with a corresponding second set of tokens, each second bucket of the plurality of second buckets associated with a respective tenant of a plurality of tenants;

prioritizing, by the computing system, each second bucket of the plurality of second buckets by adjusting a maximum number of tokens for each second bucket of the plurality of second buckets such that a first second bucket of the plurality of second buckets associated with a first tenant of the plurality of tenants has a first maximum number of tokens that is different from a second maximum number of tokens of a different second bucket of the plurality of second buckets associated with a different tenant of the plurality of tenants; and executing, by the computing system, an execution list based at least in part on a first number of tokens in the first bucket and a second number of tokens in at least one second bucket of the plurality of second buckets.

2. The computer-implemented method of claim 1, further comprising:

receiving, by the computing system, a plurality of requests to generate data backups from the plurality of tenants associated with the file system environment; and generating, by the computing system, the execution list for executing the plurality of requests based at least in part on the first bucket and the plurality of second buckets.

3. The computer-implemented method of claim 1, wherein each token of the first set of tokens represents a single action performable by the file system environment, wherein each token of each corresponding second set of tokens of a plurality of second sets of tokens represents a single action performable by the file system environment, and wherein each second set of tokens of the plurality of second sets of tokens has a different second maximum number of tokens corresponding to an allowable number of actions for a corresponding tenant.

4. The computer-implemented method of claim 1, further comprising:

identifying (i) a particular request of a plurality of requests received by the computing system and (ii) a particular tenant of the plurality of tenants associated with the particular request;

determining a first number of tokens remaining in a particular second bucket of the plurality of second buckets associated with the particular tenant;

in response to determining that the first number of tokens is greater than zero, performing one or more operations associated with the particular request; and deducting one or more tokens from the particular second bucket of the plurality of second buckets, wherein the one or more tokens is in one-to-one correspondence with the one or more operations.

5. The computer-implemented method of claim 1, further comprising:

identifying (i) a particular request of a plurality of requests received by the computing system and (ii) a particular tenant of the plurality of tenants associated with the particular request;

determining a first number of tokens remaining in a particular second bucket of the plurality of second buckets associated with the particular tenant; and in response to determining that the first number of tokens is zero or less than zero, preventing one or more operations associated with the particular request from being performed.

6. The computer-implemented method of claim 5, further comprising:

determining a second number of tokens remaining in the first bucket; and in response to determining that the second number of tokens is zero or less than zero, preventing one or more operations associated with the particular request from being performed; or in response to determining that the second number of tokens is greater than zero:

performing the one or more operations associated with the particular request; and deducting one or more tokens from the first bucket, wherein the one or more tokens is in one-to-one correspondence with the one or more operations.

7. The computer-implemented method of claim 1, further comprising:

for each single action taken by the file system environment, deducting one token from the first bucket and from a corresponding second bucket of the plurality of second buckets;

continuously refilling the first bucket based at least in part on an expected future computational capacity of the file system environment; and continuously refilling the corresponding second bucket based at least in part on a priority assigned to a corresponding tenant associated with the corresponding second bucket.

8. A system, comprising:

one or more processors; and a memory coupled to the one or more processors, the memory storing a plurality of instructions executable by the one or more processors, the plurality of instructions comprising instructions that, when executed by the one or more processors, cause the one or more processors to perform operations comprising:

populating a first bucket with a first set of tokens, the first bucket associated with global actions of a file system environment;

populating each second bucket of a plurality of second buckets with a corresponding second set of tokens, each second bucket of the plurality of second buckets associated with a respective tenant of a plurality of tenants;

prioritizing each second bucket of the plurality of second buckets by adjusting a maximum number of tokens for each second bucket of the plurality of second buckets such that a first second bucket of the plurality of second buckets associated with a first tenant of the plurality of tenants has a first maximum number of tokens that is different from a second maximum number of tokens of a different second bucket of the plurality of second buckets associated with a different tenant of the plurality of tenants; and executing an execution list based at least in part on a first number of tokens in the first bucket and a second number of tokens in at least one second bucket of the plurality of second buckets.

9. The system of claim 8, wherein the operations further comprise:

receiving a plurality of requests to generate data backups from the plurality of tenants associated with the file system environment; and generating the execution list for executing the plurality of requests based at least in part on the first bucket and the plurality of second buckets.

10. The system of claim 8, wherein each token of the first set of tokens represents a single action performable by the file system environment, wherein each token of each corresponding second set of tokens of a plurality of second sets of tokens represents a single action performable by the file system environment, and wherein each second set of tokens of the plurality of second sets of tokens has a different second maximum number of tokens corresponding to an allowable number of actions for a corresponding tenant.

11. The system of claim 8, wherein the operations further comprise:

identifying (i) a particular request of a plurality of requests receivable by the system and (ii) a particular tenant of the plurality of tenants associated with the particular request;

determining a first number of tokens remaining in a particular second bucket of the plurality of second buckets associated with the particular tenant;

in response to determining that the first number of tokens is greater than zero, performing one or more operations associated with the particular request; and deducting one or more tokens from the particular second bucket of the plurality of second buckets, wherein the one or more tokens is in one-to-one correspondence with the one or more operations.

12. The system of claim 8, wherein the operations further comprise:

identifying (i) a particular request of a plurality of requests receivable by the system and (ii) a particular tenant of the plurality of tenants associated with the particular request;

determining a first number of tokens remaining in a particular second bucket of the plurality of second buckets associated with the particular tenant; and in response to determining that the first number of tokens is zero or less than zero, preventing one or more operations associated with the particular request from being performed.

13. The system of claim 12, wherein the operations further comprise:

determining a second number of tokens remaining in the first bucket; and in response to determining that the second number of tokens is zero or less than zero, preventing one or more operations associated with the particular request from being performed; or in response to determining that the second number of tokens is greater than zero:

performing the one or more operations associated with the particular request; and deducting one or more tokens from the first bucket, wherein the one or more tokens is in one-to-one correspondence with the one or more operations.

14. The system of claim 8, wherein the operations further comprise:

for each single action taken by the file system environment, deducting one token from the first bucket and from a corresponding second bucket of the plurality of second buckets;

continuously refilling the first bucket based at least in part on an expected future computational capacity of the file system environment; and continuously refilling the corresponding second bucket based at least in part on a priority assigned to a corresponding tenant associated with the corresponding second bucket.

15. A non-transitory computer-readable memory storing a plurality of instructions executable by one or more processors, the plurality of instructions comprising instructions that, when executed by the one or more processors, cause the one or more processors to perform operations, comprising:

populating a first bucket with a first set of tokens, the first bucket associated with global actions of a file system environment;

populating each second bucket of a plurality of second buckets with a corresponding second set of tokens, each second bucket of the plurality of second buckets associated with a respective tenant of a plurality of tenants;

prioritizing each second bucket of the plurality of second buckets by adjusting a maximum number of tokens for each second bucket of the plurality of second buckets such that a first second bucket of the plurality of second buckets associated with a first tenant of the plurality of tenants has a first maximum number of tokens that is different from a second maximum number of tokens of a different second bucket of the plurality of second buckets associated with a different tenant of the plurality of tenants; and executing an execution list based at least in part on a first number of tokens in the first bucket and a second number of tokens in at least one second bucket of the plurality of second buckets.

16. The non-transitory computer-readable memory of claim 15, wherein the operations further comprise:

receiving a plurality of requests to generate data backups from the plurality of tenants associated with the file system environment; and generating the execution list for executing the plurality of requests based at least in part on the first bucket and the plurality of second buckets.

17. The non-transitory computer-readable memory of claim 15, wherein each token of the first set of tokens represents a single action performable by the file system environment, wherein each token of each corresponding second set of tokens of a plurality of second sets of tokens represents a single action performable by the file system environment, and wherein each second set of tokens of the plurality of second sets of tokens has a different second maximum number of tokens corresponding to an allowable number of actions for a corresponding tenant.

18. The non-transitory computer-readable memory of claim 15, wherein the operations further comprise:

identifying (i) a particular request of a plurality of requests and (ii) a particular tenant of the plurality of tenants associated with the particular request;

determining a first number of tokens remaining in a particular second bucket of the plurality of second buckets associated with the particular tenant;

in response to determining that the first number of tokens is greater than zero, performing one or more operations associated with the particular request; and deducting one or more tokens from the particular second bucket of the plurality of second buckets, wherein the one or more tokens is in one-to-one correspondence with the one or more operations.

19. The non-transitory computer-readable memory of claim 15, wherein the operations further comprise:

identifying (i) a particular request of a plurality of requests and (ii) a particular tenant of the plurality of tenants associated with the particular request;

determining a first number of tokens remaining in a particular second bucket of the plurality of second buckets associated with the particular tenant; and in response to determining that the first number of tokens is zero or less than zero, preventing one or more operations associated with the particular request from being performed.

20. The non-transitory computer-readable memory of claim 19, wherein the operations further comprise:

determining a second number of tokens remaining in the first bucket; and in response to determining that the second number of tokens is zero or less than zero, preventing one or more operations associated with the particular request from being performed; or in response to determining that the second number of tokens is greater than zero:

performing the one or more operations associated with the particular request; and deducting one or more tokens from the first bucket, wherein the one or more tokens is in one-to-one correspondence with the one or more operations.

\* \* \* \* \*